United States Patent [19]

Neidhardt

[11] Patent Number: 5,271,342

[45] Date of Patent: Dec. 21, 1993

[54] FERTILIZER INJECTION DEVICE

[76] Inventor: Dale Neidhardt, R.R. #1, Box 130, New Salem, N. Dak. 58563

[21] Appl. No.: 912,563

[22] Filed: Jul. 13, 1992

Related U.S. Application Data

[63] Continuation-in-part of Ser. No. 768,473, Sep. 30, 1991, abandoned, which is a continuation of Ser. No. 677,369, Mar. 26, 1991, abandoned, which is a continuation of Ser. No. 478,746, Feb. 12, 1990, abandoned, which is a continuation of Ser. No. 188,266, Apr. 29, 1988, abandoned.

[51] Int. Cl.⁵ .............................. A01C 23/02
[52] U.S. Cl. .................................... 111/119
[58] Field of Search ............... 239/24, 146, 160; 111/7.1, 7.4, 119; 172/699, 700, 720; 222/86

[56] References Cited

U.S. PATENT DOCUMENTS

| | | | |
|---|---|---|---|
| 1,038,084 | 9/1912 | Carroll | 111/7 |
| 2,168,099 | 8/1939 | Hawkins et al. | 111/7 |
| 2,424,520 | 7/1947 | Tonkin | 71/4 |
| 2,598,121 | 5/1952 | Hannibal | 111/7 |
| 2,843,066 | 7/1958 | Dugan | 111/7 |
| 2,849,970 | 4/1958 | Coberly | 111/7 |
| 3,038,424 | 6/1962 | Johnson | 111/7 |
| 3,092,052 | 6/1963 | Anderson | 111/7 |
| 3,326,152 | 6/1967 | Frontzen | 111/7 |
| 3,625,166 | 12/1971 | Woodley | 111/7 |
| 3,834,330 | 9/1974 | Wallace | 111/7 |
| 3,863,842 | 2/1975 | McFarland et al. | |
| 3,967,564 | 7/1976 | Emling | 111/7 |
| 4,033,271 | 7/1977 | Williams et al. | 111/7 |
| 4,079,680 | 3/1978 | Davis | |
| 4,129,082 | 12/1978 | Betulius | 111/7 |
| 4,141,301 | 2/1979 | Coldren | 111/7 |
| 4,445,445 | 5/1984 | Sterrett | |
| 4,592,294 | 6/1986 | Dietrich, Sr. et al. | 111/7 |
| 4,638,748 | 1/1987 | Kopecky | 111/7 |
| 4,683,826 | 8/1987 | Solie et al. | 111/7 |
| 4,711,187 | 12/1987 | Schultz | 111/7 |

Primary Examiner—Andres Kashnikow
Assistant Examiner—Kevin Weldon
Attorney, Agent, or Firm—Merchant, Gould, Smith, Edell, Welter & Schmidt

[57] ABSTRACT

A device is provided for injecting fertilizer into soil simultaneous with tilling or plowing the soil. The fertilizer injection device is attached to a shank portion of a plow and includes a distribution conduit which is spaced behind and separated from a point on a soil moving surface of a trailing edge portion of the soil moving tool. Fertilizer is thus more effectively injected into the soil resulting in a high rate of absorption.

5 Claims, 3 Drawing Sheets

FERTILIZER INJECTION DEVICE

This is a continuation-in-part of application Ser. No. 07/768,473, filed Sep. 30, 1991 now abandoned which is a continuation of application Ser. No. 07/677,369, filed 3/26/91, abandoned, which is a continuation of application Ser. No. 07/478,746, filed 2/12/90, abandoned, which is a continuation of application Ser. No. 07/188,266, filed 4/29/88, abandoned.

FIELD OF THE INVENTION

The present invention relates generally to the field of agricultural implements and more specifically to a fertilizer injection device which is used with soil moving tools to improve the absorption rate of fertilizer injected into the soil.

BACKGROUND OF THE INVENTION

Within the field of agricultural implements, there exists a need for a device which injects fertilizer into the subsoil of an agricultural area while simultaneously tilling that same area. Further, there exists a need to inject fertilizer into the subsoil so that only a very minimal amount, if any, of the fertilizer escapes through the soil into the atmosphere. By combining the tilling and fertilizing operations, and by minimizing the escape of fertilizer from the subsoil, substantial economic and productivity improvements are realized.

A variety of fertilizer injection devices have evolved. Typically, a fertilizer injection device is positioned behind a knife-like implement which is designed to move through the soil. A narrow furrow or groove is thus formed in the subsoil by the implement and fertilizer is placed into that groove behind the implement. Significant inefficiencies occur when using such devices. Principally, such devices do not provide tilling means and therefore require tilling of the soil either before or after the injection of fertilizer. Also, using such devices, a substantial amount of fertilizer is often lost from the soil due to inadequate injection beneath a stable soil layer.

Another technique for injecting fertilizer into subsoil includes a plow-like implement designed for tilling soil which includes an attached fertilizer dispensing means. Typically, such fertilizer dispensing means are attached to portions of the soil moving surfaces, such as backsides of the plow blades. Indeed, attachment of injection devices to portions of large blade plows is known in the art. However, substantial problems arise on both large and small tools which may include injection devices attached to blade portions. Frequently, fertilizer injection is attempted when the soil temperature is quite low. Therefore, the blades or soil moving surfaces also become quite cold. This results in the soil moving tool imparting coldness to the attached injection device and the fertilizer within, causing flow problems and possible clogging of the device.

Yet another problem exists with such devices because the point where the fertilizer is dispensed into the subsoil is typically along the inner sides of the soil moving blades or at the immediate tip of a rearmost trailing edge of a soil moving blade. The problem exists due to the broken soil conditions at those points of fertilizer distribution. This frequently results in significant leakage of fertilizer from the soil due to a non-stable and/or non-uniform soil layer beneath which the fertilizer was injected. Further, such fertilizer dispensing devices are typically not readily interchangeable and are permanently attached to a particular plow or shovel.

What has been needed therefore has been a device which is removably attached to a portion of a soil moving tool which permits simultaneous tilling and fertilizing of soil. Moreover, a need exists for such a device which more efficiently dispenses fertilizer into the soil so that a greater amount of fertilizer remains beneath the soil, rather than escaping to the atmosphere.

What has been further needed is a device for injecting fertilizer into soil which includes means for insulating and maintaining the fertilizer at a predetermined temperature range prior to injection into the subsoil.

These and other problems are solved by the present invention. Yet other objects and advantages will become apparent from the following descriptions, taken in connection with the accompanying drawings wherein are set forth by way of illustration certain embodiments of the present invention.

SUMMARY OF THE INVENTION

A device is provided for injecting fertilizer into soil behind soil moving surfaces of a soil moving tool which is mounted on an agricultural implement, such as a tractor. The device permits improved absorption of the fertilizer by the soil and comprises conduit means and positioning means. The conduit means include a substantially vertically oriented supply conduit means for receiving fertilizer from a fertilizer supply. Also, a substantially horizontally oriented and rearwardly angled distribution conduit means is provided which is connected with the supply conduit means and which includes a first end portion for receiving fertilizer from the supply conduit means and a second end portion for distributing the fertilizer to the soil. The positioning means allows for positioning the distribution conduit means second end portion to a point which is spaced behind and separated from a point oft a soil moving surface of a trailing edge portion of the soil moving tool. The space permits settling of the soil prior to injecting the fertilizer into the soil, and thus provides improved retention and absorption of the fertilizer in the soil. The conduit means of this device is attached to the positioning means, and the positioning means is removably and adjustably attached to the soil moving tool.

DETAILED DESCRIPTION WITH PREFERRED EMBODIMENTS

Detailed embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a basis for the claims and as a representative basis for teaching one skilled in the art to variously employ the present invention in virtually any appropriately detailed system or structure. It will be understood that in some circumstances relative material thicknesses and relative component sizes may be shown exaggerated to facilitate an understanding of the invention.

Figure 1:
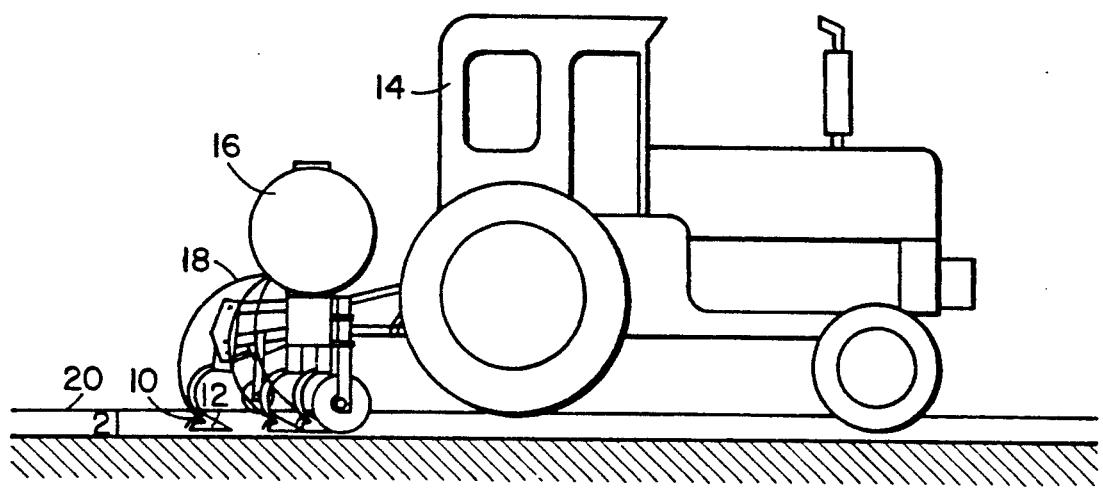
FIG. 1 is an environmental view of a means for pulling the soil moving tool and attached fertilizer injection device of the present invention through subsoil.

Referring to FIG. 1, a fertilizer injection device 10 is illustrated. Fertilizer injection device 10 is shown operably attached to a soil moving tool 12, such as a plow, shovel, cultivator, or the like, which is attached to an agricultural implement 14, such as a tractor. A fertilizer supply means 16 is preferably carried or pulled by agricultural implement 14 during use of device 10. Fertilizer supply means 16 preferably includes tubular means 18 which permits flow of fertilizer from fertilizer supply means 16 to fertilizer injection device 10 which is operably positioned partially beneath the soil surface 20. Fertilizer is then distributed into the subsoil 21 at a point spaced behind a trailing edge of soil moving tool 12 so that the fertilizer is absorbed by the soil. It should be observed that fertilizer may be provided in a pressurized mode, for example, at 60 p.s.i., in which case it is called "hot flow". Alternately, a "cold flow" mode may include fertilizer which is only slightly pressurized relative to ambient and which relies substantially on free flow through injection device 10. In either of the "hot flow" or "cold flow" modes, fertilizer injection device 10 provides substantial advantages by increasing the percent of fertilizer absorbed by the soil and therefore reducing the amount of fertilizer escaping into the atmosphere. Device 10 also permits injection of fertilizer simultaneous with tilling or plowing operations, resulting in substantial economies of labor, fuel, and other resources.

Figure 2:
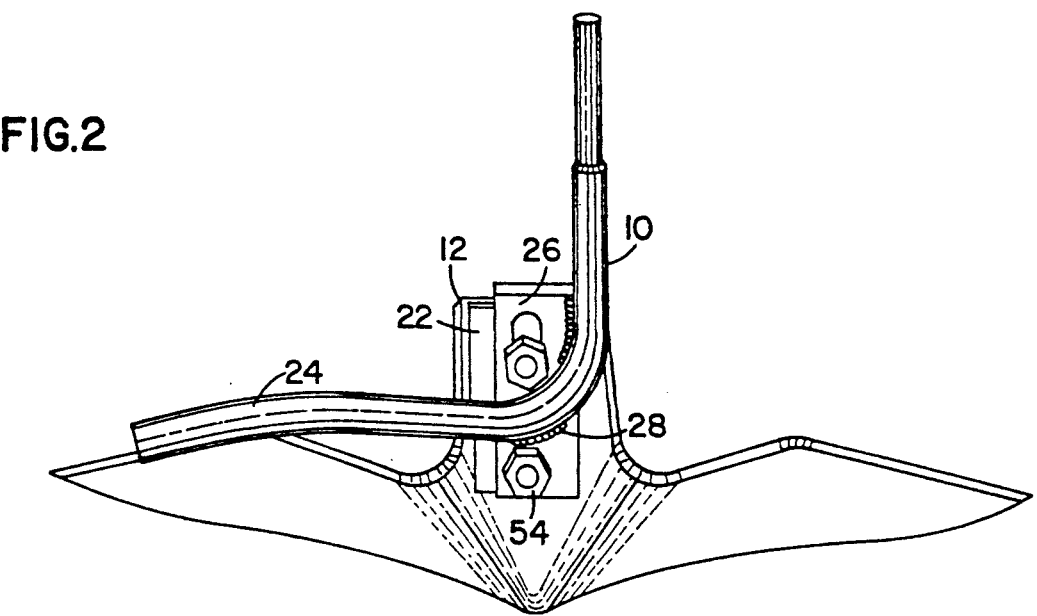
FIG. 2 is a rear angled elevation view of a preferred embodiment fertilizer injection device attached to a shank portion of a soil moving tool.
Figure 4:
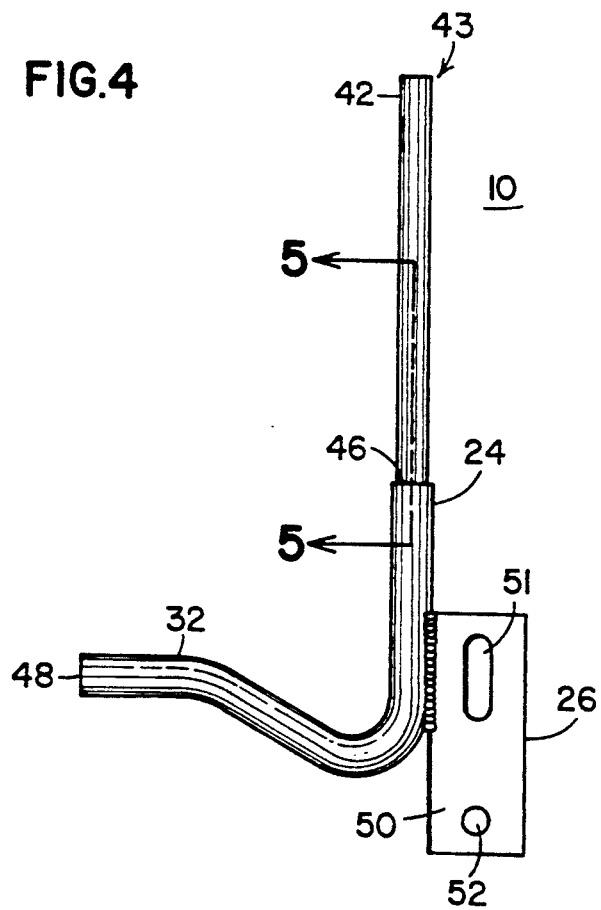
FIG. 4 is a rear-elevation view of a fertilizer injection device illustrating the conduit means and the positioning means.
Figure 6:
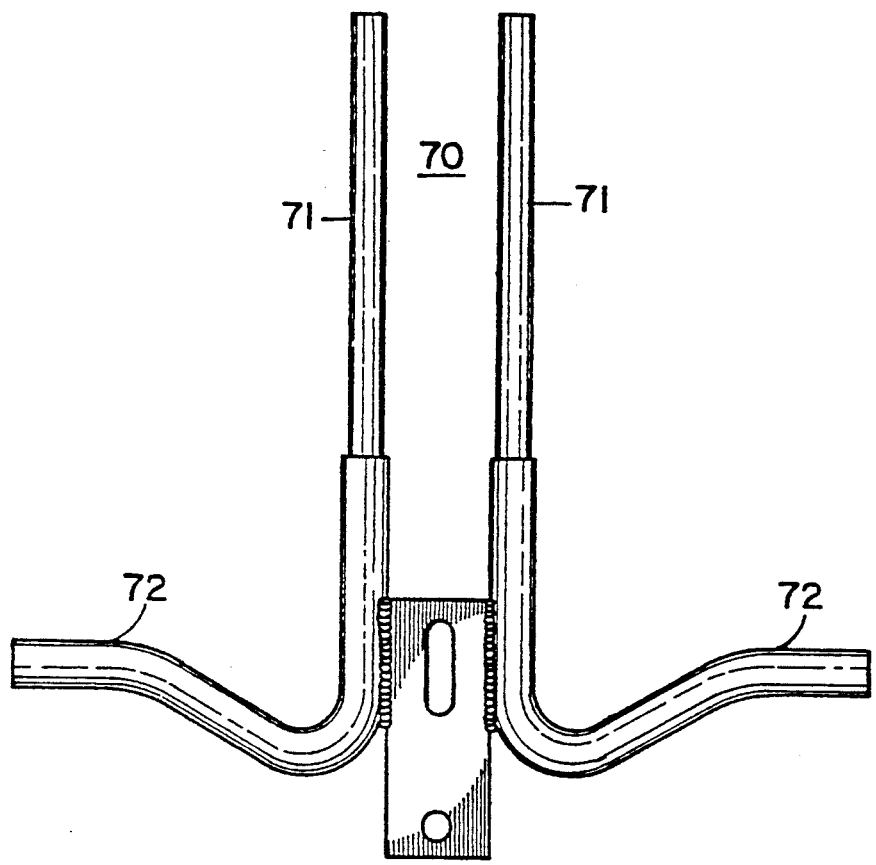
FIG. 6 is a rear elevation view illustrating an alternate embodiment fertilizer injection device having a plurality of conduit means attached to a positioning means.

FIG. 2 is a rear angled elevation view of a preferred embodiment fertilizer injection device 10 shown attached to a shank portion 22 of a soil moving tool 12. As illustrated, device 10 comprises hollow conduit means 24 through which fertilizer is moved from fertilizer supply means 16 to subsoil 21, and positioning means 26 for attaching device 10 to soil moving tool 12. More specifically, positioning means 26 allows positioning of device 10 on soil moving tool 12 so that the distribution of fertilizer is properly placed at a point spaced behind soil moving tool 12. Although fertilizer injection device 10 may be comprised of a single molded unit, it is preferable that conduit means 24 and positioning means 26 constitute separate members joined by welds 28 or similar attaching means. Conduit means 24 and positioning means 26 may be joined in overlapping relation, as shown in FIG. 2, or in side-by-side relation, as shown in FIG. 4. Further, conduit means 24 may be left oriented, as depicted in FIG. 2, or it may be right oriented, or left and right oriented as shown in FIG. 6.

Figure 3:
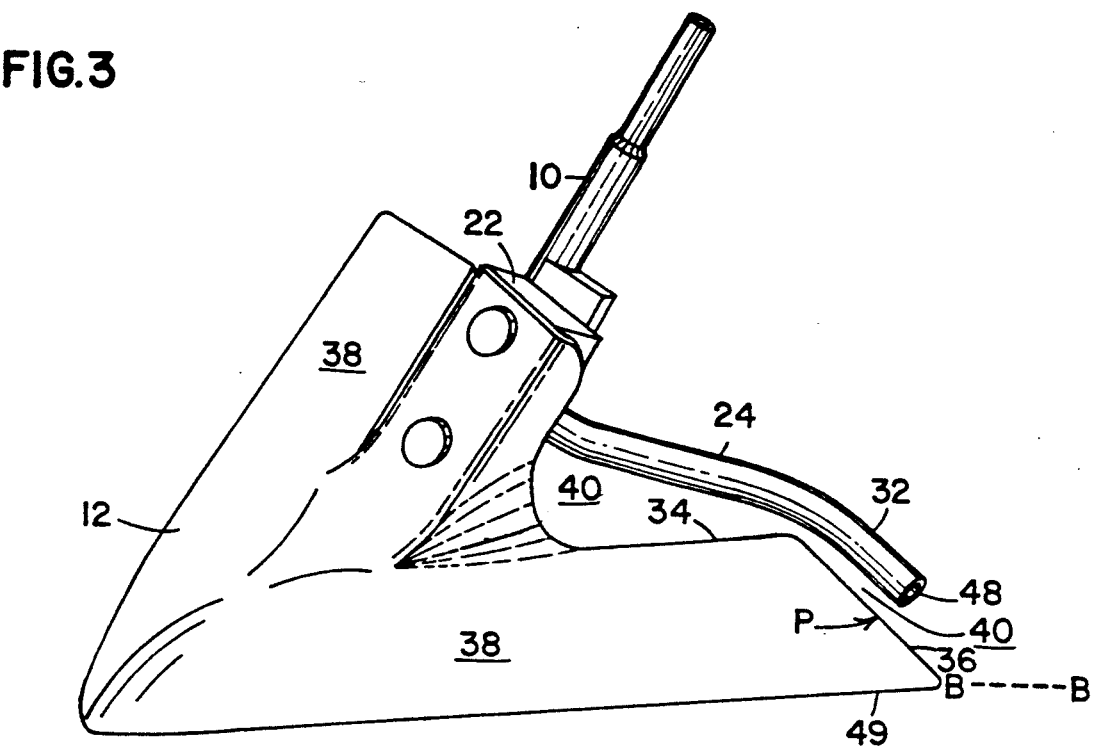
FIG. 3 is a perspective view of a preferred embodiment fertilizer injection device attached to a soil moving tool.

FIG. 3 illustrates a perspective view of a preferred embodiment fertilizer injection device 10 and a representative soil moving tool 12 which are analogous to those shown in FIG. 2. Preferably, device 10 is removably attached to soil moving tool 12 at the rear facing side of shank portion 22. A selectively removable fertilizer injection device, such as device 10, provides flexibility of use through operational attachment to variously sized plows, cultivators, or other soil moving tools. Further, as shown in FIG. 3, preferred device 10 conduit means 24 includes substantially horizontally oriented and rearwardly angled distribution conduit means 32 which may be variously lengthed and angled so as to provide spaced separation between back sides 34 and trailing edges 36 of soil moving surfaces 38 of soil moving tool 12. This construction and arrangement of device 10 permits its use with a variety of variously-shaped soil moving tools 12 as well as providing a space 40 which allows for soil settling to occur ahead of the location where fertilizer is to be injected. Accordingly, device 10 may even be shaped for use with soil moving tools 12 having very narrow or pointed blade tips with sharply angled back sides 34.

Referring to FIG. 4, fertilizer injection device 10 is illustrated. Conduit means 24 includes an inner surface 43 defining a fluid passageway to enable the flow of fertilizer therethrough. Preferably, conduit means 24 comprises lower distribution conduit means 32 and upper supply conduit means 42. Preferred supply conduit means 42 comprises a substantially vertically oriented hollow conduit for receiving fertilizer from tubular means 18 and fertilizer supply means 16. Also, substantially horizontally oriented and rearwardly angled distribution conduit means 32 includes first end portion 46, for receiving fertilizer in flow through communication from supply conduit means 42, and second end portion 48 for distributing the fertilizer into the soil.

Referring to FIG. 3 and FIG. 4, positioning means 26 is constructed and arranged for attachment to soil moving tool 12 and for positioning distribution conduit means 32 second end portion 48 to a location spaced behind and separated from a point on a soil moving surface 38 of a trailing edge portion of soil moving tool 12. Preferably, fertilizer is distributed from second end portion 48 generally toward a soil region represented approximately by line B—B in FIG. 3, extending rearwardly from the outer blade surface 49 of soil moving tool 12. The region generally represented by line B—B comprises an optimal envelope within which to inject fertilizer so that the fertilizer will be covered by a stable layer of soil and become substantially completely absorbed. Prior fertilizer injection systems associated with plows, tilling devices, or other combined implements for fertilizing and tilling, provide means for distributing fertilizer which do not permit optimal absorption of the fertilizer in the soil. For example, distribution of fertilizer at points along back sides 34 of wide tipped soil moving surfaces 38 would result in fertilizer being injected into soil ahead of follow-on portions of soil moving surfaces 38. Alternately, distribution of fertilizer immediately adjacent trailing edge 36 may result in substantial loss of fertilizer due to the non-stable soil layer caused by turbulence located at the soil moving surface trailing edge 36. This turbulence may be even more pronounced when a fertilizer distribution means is integrally attached to soil moving surfaces 38 due to the resulting non-laminar flow of the soil as it rides off the fertilizer distribution means surfaces. Accordingly, placement of the fertilizer distribution means at a location separated from and substantially behind a generally rearmost trailing edge 36 of a soil moving surface 38 on soil moving tool 12 permits the fertilizer to be injected beneath a soil layer which becomes more stable and therefore less permeable to otherwise vertically ascending fertilizer and byproducts.

As shown in FIG. 4, positioning means 26 preferably comprises a plate 50 having means for substantially aligning distribution conduit means second end portion 48 with a predetermined or desired point on soil moving tool 12. As further illustrated in FIGS. 3 and 4, predetermined point P on soil moving tool 12 preferably comprises a point along a trailing edge 36 of a soil moving surface 38. Preferably, distribution conduit means 32 is spaced away from soil moving surfaces 38 and distribution conduit means second end portion 48 is located behind and separated from point P. This separation space 40 prevents a cold plow from imparting such coldness to conduit means 24 and the fertilizer therein. Moreover, space 40 allows for soil settling to occur ahead of or on top of fertilizer injection points. Also, space 40 permits proper flow and scouring by the soil on soil moving surfaces 38 rather than causing possible blockage or condensation leading to soil clump formation on soil moving surfaces 38. Although the size of space 40 may vary with the size of the tool being used, excellent results have been achieved with a separation distance of between about 0.25-0.50 inch (0.635-1.27 centimeters).

Proper positioning of second end portion 48 in relation to point P is achieved by selection of suitably lengthed and angled distribution conduit means 32 and appropriate attachment of plate 50 or other positioning means on soil moving tool 12. Device 10 is particularly well adapted for use with soil moving tools 12 having sweeps with sizes ranging generally between about 6-20 inches (15.24-50.8 centimeters). Preferably, plate 50 comprises at least one aperture extending through the plate. As shown in FIG. 4, preferred device 10 includes plate 50 having a slotted aperture 51 and a circular aperture 52. Apertures 51 and 52 are preferably constructed and arranged for receiving attaching means 54, shown in FIG. 2, therethrough for removeably attaching device 10 to soil moving tool 12.

Moreover, the angled structure of distribution conduit means 32 often results in a significant portion of the distribution conduit means 32 surface area being substantially behind shank portion 22 of soil moving tool 12. This further minimizes the soil disruption which otherwise creates means for fertilizer escape into the atmosphere through nonstable soil layers. This is particularly important when fertilizer, such as anhydrous ammonia, or other material is injected into the soil in hot or gaseous form. Indeed, conventional anhydrous ammonia injection devices often provide for inadequate absorption of the fertilizer by the soil. Conversely, absorption tests utilizing the fertilizer injection device 10 of the present invention display improved rates of fertilizer absorption including in excess of 90 percent absorption. Therefore, providing space 40, as shown in FIG. 3, between trailing edge 36 of a soil moving tool 12 and the point of fertilizer distribution utilizing a conduit means which is not attached to a soil moving surface, results in significant efficiencies and improved agricultural operations.

Figure 5:
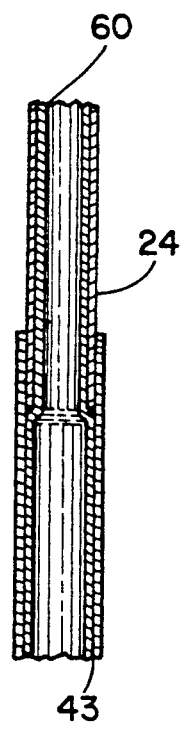
FIG. 5 is a side cross-sectional view taken generally along line A—A, FIG. 4, illustrating an insulator liner insert conformally placed within the inner diameter of the conduit means.

Even further improvements in the process of laying down fertilizer may be achieved with a fertilizer injection device 10 of the present invention utilizing an insulator liner insert 60, shown in FIG. 5. Although not required to achieve advantages already provided by device 10, insulator liner insert 60 provides the further advantage of maintaining the fertilizer which is in conduit means 24 within a predetermined temperature range prior to injecting the fertilizer into the soil. This is particularly important due to the frequent subfreezing temperature ranges which the fertilizer is otherwise exposed to. Referring to FIG. 5, which details a side cross-sectional view taken generally along line A—A, FIG. 4, an insulator liner insert 60 is shown conformally placed within the inner diameter of conduit means 24. For example, conduit means 24 may be constructed of ⅜ inch (0.9525 cm) inner diameter piping, and insulator liner insert 60 may be constructed of ¼ inch (0.635 cm) inner diameter material. Preferably, insulator liner insert 60 comprises a hollow tubular member having an inner diameter through which fertilizer flows and that is constructed of material which will substantially insulate and maintain the fertilizer therein at a predetermined temperature range. Preferably, insulator liner insert 60 extends through the entire length of conduit means 24. It should be observed that fertilizer which is being injected at higher pressures may utilize a conduit means 24 which has a smaller sized second end portion 48 than is needed for a "cold flow" method of operation. Further, use of insulator liner insert 60 may provide strengthening means to conduit means 24. Preferably, however, conduit means 24 is constructed of seamless tubing extra-heavy duty pipe. Therefore, use of insulator liner insert 60 permits improved environmental control for the fertilizer as well as strengthened conduit means 24.

FIG. 6 illustrates an alternate embodiment fertilizer injection device 70. In FIG. 6, device 70 includes a fertilizer injection device having substantially vertically oriented supply conduit means 71 and distribution conduit means 72. Alternate embodiment fertilizer injection device 70 provides multiple fertilizer distribution points corresponding with a plurality of soil moving surfaces on a soil moving tool. Use of alternate embodiment fertilizer injection device 70 in combination with fertilizer injection device 10 permits laying down of fertilizer during soil moving agricultural operations without disrupting previously injected fertilizer. For example, a plurality of tools 12 may be arranged in rearwardly expanding rows. Outer tools 12 may be appropriately configured with either left or right oriented devices 10. However, tools 12 medially located in rows may be configured with a right and left oriented injection device 70. These various configurations permit multiple injection point patterns to prevent churning of soil which is covering injected fertilizer.

Accordingly, the injection device of the present invention provides means for greatly improving the absorption percentages of fertilizer or other substances injected into soil. Further, injection device 10 is simple to construct, install, and maintain.

It is to be understood that while certain embodiments of the present invention have been illustrated and described, the invention is not to be limited to the specific forms or arrangements of parts described and shown above, since others skilled in the art may devise other embodiments still within the limits of the claims.

What is claimed is:

1. A device for injecting fertilizer into subsoil behind soil moving surfaces of a soil moving tool mounted on a shank of an agricultural implement which provides improved absorption of the fertilizer by the soil including:

(a) a fluid conduit means for receiving and distributing fertilizer, said fluid conduit means comprising:
  (i) substantially vertically oriented supply conduit means for receiving the fertilizer from a fertilizer supply;
  (ii) distribution conduit means connected in fluid tight relationship with said supply conduit means, said distribution conduit means having a first vertical portion for receiving fertilizer from said supply conduit means and a second horizontal portion having a distribution outlet for distributing the fertilizer to the soil, said second horizontal portion having a non-contact relationship with said tool to create an air space therebetween such that said distribution outlet is located behind and separated from a point on a rearmost trailing edge portion of the soil moving tool;
(b) positioning means for positioning said distribution conduit means for distribution of fertilizer from said distribution outlet so that the fertilizer is then substantially completely covered by a layer of stable subsoil; and
(c) means for fixedly attaching said positioning means to said shank.

2. The device in accordance with claim 1 including a hollow insulator liner insert having an inner diameter enabling the flow of fertilizer therethrough, said insulator liner insert being constructed and arranged for conformal insertion into said fluid conduit means to substantially insulate and maintain the fertilizer therein at a predetermined temperature range.

3. A fertilizer injecting device mounted on an agricultural implement having access to a fertilizer supply, said implement having a shank and a soil moving tool, said implement further including means for attaching said soil moving tool to said shank, said soil moving tool with a soil moving surface ending in a trailing edge portion, said device comprising:
  means for directing fertilizer beneath a stable layer of soil behind a predetermined location on said trailing edge portion of said soil moving tool, said fertilizer directing means including a supply conduit means and single distribution conduit means for communicating fertilizer from said supply conduit means along a continuous passageway having a horizontal portion to a distribution outlet, said horizontal portion extending away from said shank and having a non-contact relationship with said tool to create an air space therebetween;
  bracket means for supporting said distribution conduit means with respect to said shank, said bracket means being attached to said shank; and
  a weld fixedly attaching said distribution conduit means to said bracket means.

4. A device according to claim 3, wherein said bracket means comprises a plate having means for substantially aligning said distribution outlet with said predetermined location on the soil moving tool.

5. A device according to claim 4 wherein said aligning means comprises both a slotted aperture and a circular aperture.

* * * * *

UNITED STATES PATENT AND TRADEMARK OFFICE
CERTIFICATE OF CORRECTION

PATENT NO. : 5,271,342
DATED : December 21, 1993
INVENTOR(S) : Dale Neidhardt

It is certified that error appears in the above-indentified patent and that said Letters Patent is hereby corrected as shown below:

Column 2, line 38, "oft" should read --on--.

Column 8, line 26, claim 4, delete "outlet" after the word "distribution".

Column 8, line 26, insert --conduit means second end portion-- after the word "distribution".

Column 8, lines 28 & 29, claim 5, "aligning" should read --positioning--.

Signed and Sealed this

Twentieth Day of September, 1994

Attest:

BRUCE LEHMAN

Attesting Officer

Commissioner of Patents and Trademarks